United States Patent
Evans

[15] 3,641,940
[45] Feb. 15, 1972

[54] CARGO RESTRAINT MECHANISM

[72] Inventor: Richard A. Evans, Smyrna, Ga.

[73] Assignee: Lockheed Aircraft Corporation, Burbank, Calif.

[22] Filed: Mar. 9, 1970

[21] Appl. No.: 17,794

[52] U.S. Cl. ............... 105/369 A, 105/366 C, 248/361 R
[51] Int. Cl. ............... B60p 7/08, B61d 45/00, B65j 1/22
[58] Field of Search ............... 105/366 B, 366 C, 369 A; 280/179; 214/38 D; 248/119 R, 361 A, 361 R

[56] References Cited

UNITED STATES PATENTS

| | | | |
|---|---|---|---|
| 3,493,210 | 2/1970 | Brenner | 105/366 C |
| 3,262,588 | 7/1966 | Davidson | 105/366 C |
| 3,210,038 | 10/1965 | Bader et al. | 280/179 |
| 3,282,550 | 11/1966 | Warren | 105/369 A |
| 3,504,636 | 4/1970 | Adler | 105/366 C |
| 3,257,970 | 6/1966 | Gutridge | 105/366 C |

Primary Examiner—Drayton E. Hoffman
Attorney—John J. Sullivan and George C. Sullivan

[57] ABSTRACT

This cargo holddown device comprises two spring-biased levers mounted for rotation on fixed points disposed at right angles to one another, each adapted to engage and restrain one edge of adjacent cargo pallets or containers while serving at the same time as a spacer between the pallets or containers. The springs associated with the levers are biased in opposite directions permitting them to be maintained in either an erect or depressed position by the sequential manipulation of one lever with respect to the other due to their position and pivotal mountings. Such manipulation requires no tools or special equipment, and can be readily accomplished by foot by the operator without bending or kneeling down.

8 Claims, 3 Drawing Figures

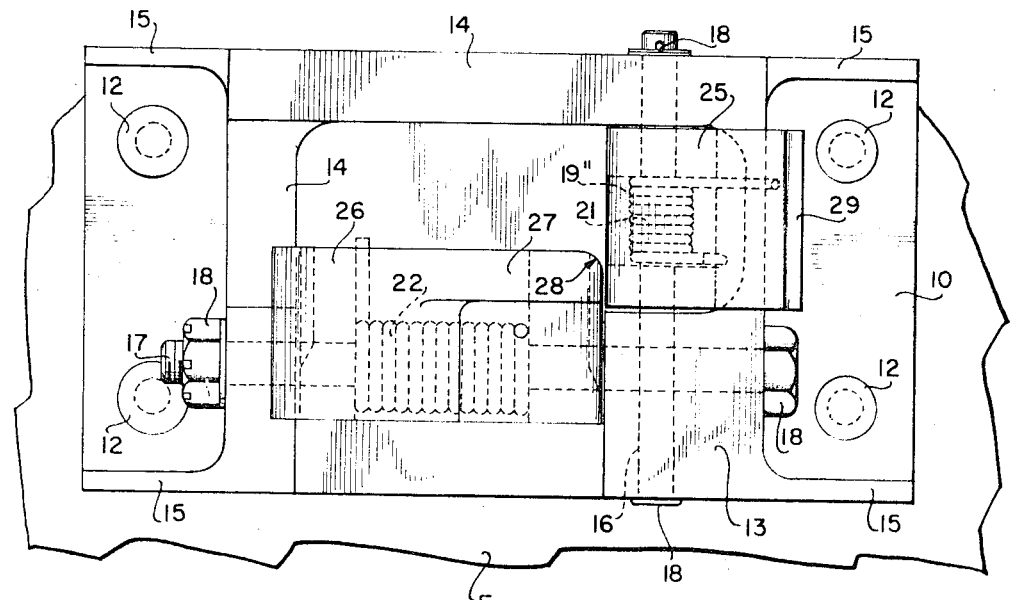
FIG_1
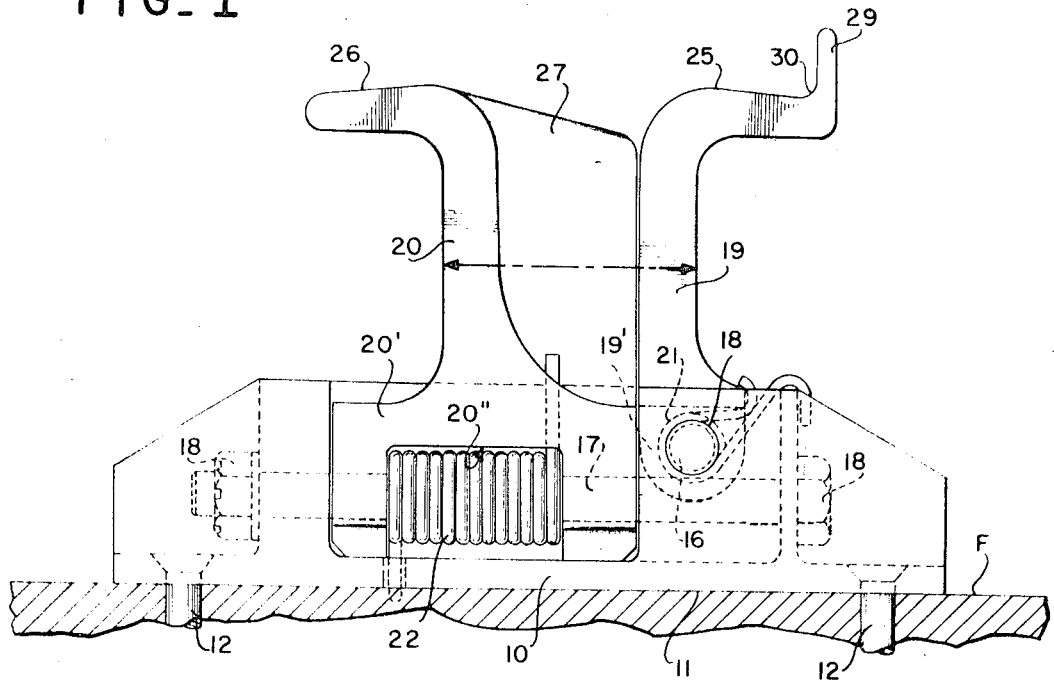
FIG_2

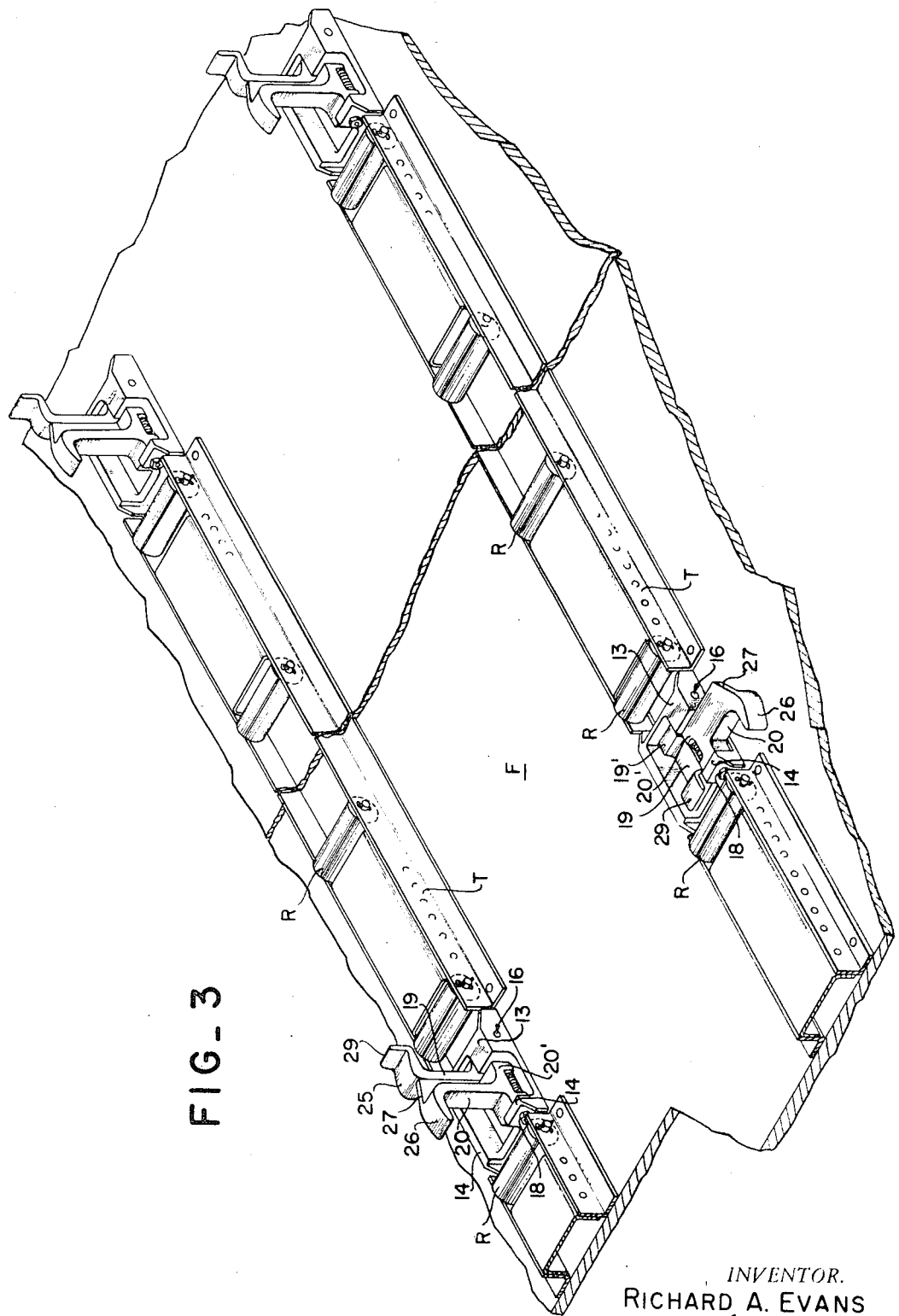
FIG_3

CARGO RESTRAINT MECHANISM

This invention relates to cargo restraint mechanisms designed and adapted to anchor and/or hold down palletized or containerized cargo against movement under various load conditions which may occur while on board vehicles transporting them, and more particularly to such a mechanism that is readily and easily extensible and retractable to and from operative and inoperative positions with respect to the surface, such as walls, floors or the like in which it is mounted.

While the cargo restraint mechanism contemplated by the present invention is readily adaptable for use in all types of commercial vehicles such as trucks, railroads, cars, ships, etc., it finds particular applicability in high-speed carriers such as modern aircraft. The reason for this is that the device is so designed and constructed that heavily laden pallets can be rapidly on and off loaded and yet thoroughly secured to withstand all conditions of operation of the aircraft accompanying the various flight regimes and including emergency, even crash, conditions.

Present-day operation of modern aircraft has made it desirable to palletize or containerize cargo in order to insure the optimum utilization of payload space and minimize turnaround time for the aircraft. At the same time, these pallets and containers have been standardized to the extent that they are ideally adapted for particular loads. It goes without saying that a holddown and an anchoring means employed to secure such pallets and containers must be reliable lest substantial damage and injury results in the course of flight conditions and general operation of the aircraft.

The present invention, therefore, is directed toward the solution of many of the problems that exist in connection with these restraining devices by the provision of an improved mechanism or fitting to secure containers and pallets. This proposed fitting is characterized by its ease of operation to and from the extreme positions where it is located in the cargo-engaging position and in a stowed or out-of-the-way position to facilitate the on-and-off loading of other containers and pallets as well as the use of the compartment or hold for other purposes. It is specifically designed to a minimum size whereby it may be employed between adjacent pallets or containers to act as a spacing element and thereby maximize the total cargo area for transport and shipment use.

The design and construction of this mechanism is totally devoid of complexity to insure its reliability in operation. Its moving parts are so coordinated and related as to minimize chances of their failure due to binding or other interference when exposed or subjected to foreign matter such as dirt and debris which is prevalent in cargo areas where these devices are typically installed and employed.

More specifically, the cargo restraint device herein proposed comprises a fitting adapted to be fixedly secured to a supporting and mounting surface which includes a pair of cargo-engaging members or levers mounted thereon in opposition one to the other so as to engage adjacent cargo-laden containers or pallets. These engaging levers are disposed at right angles to each other and spring loaded in opposition one to the other, each one being designed to retain and secure the other when located in its biased position of extension or retraction. Each lever includes manipulating means facilitating its movement in opposition to its biased direction. This allows operation of the device especially when mounted in the floor or supporting surface for the cargo quickly by the foot of a workman without requiring him to bend down or kneel thereby speeding the entire loading and unloading operation. The spring loading of the levers in opposition requires only the movement of the one lever against its spring loading whereby the other lever is allowed to automatically move to the desired position.

With the above and other objects in view as will be apparent, this invention consists in the construction, combination, and arrangement of parts all as hereinafter more fully described, claimed and illustrated in the accompanying drawings, wherein:

FIG. 1 is a plan elevation of a cargo restraint mechanism designed and constructed in accordance with the teachings of this invention and showing the cargo-engaging levers in their operable position, i.e., the position to engage their respective pallets and/or containers;

FIG. 2 is a side elevation thereof, i.e., a view taken from the bottom of FIG. 1; and FIG. 3 is an isometric view of a cargo floor modified to include the restraint mechanism shown in FIGS. 1 and 2 as they might be installed therein in conjunction with track and roller elements typically found in cargo compartments or holds on aircraft to facilitate on-and-off loading of containers and pallets.

Referring more particularly to the drawings, 10 designates a plate and support member formed on one side by a surface 11 adapted to conform with the support structure against which it abuts. Such support structure may, for example, be the floor F within the cargo area or compartment of an aircraft. This plate 10 is generally rectangular in plan and is pierced adjacent each corner by a hole through which fastening means such as a bolt 12 is adapted to pass and connect the plate 10 to the floor F. Thus secured to the cargo compartment floor F, the plate 10 aligns with the track T also bolted or otherwise anchored to the floor F and including a series of rollers R with peripheral surfaces adapted to contact the cargo containers or pallets and facilitate the on-and-off board loading thereof.

Alternately, the plate 10, if desired, may be fabricated as an integral part of or even constitute track T located in predetermined position thereon. Where it is desirable to allow for adjustment of the relative position of successive plates 10 this may be accomplished by securing each plate 10 to the track T through bolts 12 or the like removably connected to the upright sides of the track T through selected holes provided in the length thereof.

Such alternative constructions are, of course, not a part per se of the present invention, but are mentioned only to indicate how the restraint mechanism herein proposed lends itself to various installations. The particular installation shown in FIG. 3 is, therefore, illustrative only and not in any way restrictive.

The upper side of the plate 10 is formed or otherwise provided with laterally extending lugs or arms 13 and 14. There are two arms 14 which are disposed at right angles to each other, one adjacent a longitudinal edge of the plate 10 and the other extending transversely of the plate 10 proximate one end thereof. The lug 13 is located proximate the other end of plate 10 and adjacent the other longitudinal edge thereof, being formed or otherwise provided with a side face substantially parallel to and facing the corresponding side face of each arm 14. Integral gussets 15 extend from each of the arms or lugs 13 and 14 to the adjacent corner or edge of the plate 10 to act as further support thereof.

Each arm 14 is pierced by a transverse opening adjacent its end nearer the lug 13 and a similar opening pierces the lug 13 in alignment with each of these arm openings for cooperation therewith in receiving and passing therethrough bolts 16 and 17. These holes and thus the bolts 16 and 17 mounted therein are located in different planes, the bolt 16 associated with the transverse edge of the plate 10 by way of example being shown as lying in a plane above the other bolt 17. Conventional head and nut means or the equivalent designated 18 are provided on opposite ends of each bolt 16 and 17 to secure it to the lugs or arms 13 and 14 as described.

A cargo-engaging member or lever 19 and 20 respectively is rotatably mounted on that portion of each bolt 16 and 17 disposed between the associated arms 13 and 14. To this end, each such lever 19 and 20 terminates in a boss 19' and 20' respectively, which is pierced by an opening for the passage of its bolt 16 or 17. The dimension of each boss 19' and 20' is substantially equal to that of the space defined by the arms 13 and 14 to which it is mounted so as to minimize sliding movement thereon. Medially of its length, each lever 19 and 20 is notched or cut out as at 19'' and 20'' to receive and accommodate a torsion spring 21 and 22 respectively adapted to surround its bolt 16 or 17. The opposite ends of each spring 21 and 22 terminate in extensions which engage respectively their lever 19 or 20 and a convenient adjacent portion of the plate 10. In this way, each lever 19 and 20 is biased in an opposite direction. In the preferred embodiment illustrated, the lever 19 is by way of example spring loaded down, while the other lever 20 is spring loaded up.

At its outer end each lever 19 and 20 terminates in a lateral flange 25 and 26 respectively which extend in opposite directions, the flange 25 being substantially at right angles to the plane of the bolt 16 and the flange 26 being substantially parallel with the plane of the bolt 17. Each lever 19 and 20 thereby provides recess means adapted to accommodate a complemental edge of the standard container or pallet currently being employed in aircraft, when installed as illustrated in FIG. 3 and disposed in the upright or operative position of FIG. 2. At this time, the medial portion of each lever 19 and 20 is substantially vertical defining a predetermined dimension as indicated by the arrow in FIG. 2 which constitutes the spacing to be maintained between the adjacent containers or pallets engaged thereby. Thus disposed, the lever 20 of one restraint mechanism cooperates with the lever 19 of the next restraint mechanism to completely secure the container or pallet interposed therebetween.

In view of the foregoing construction and arrangement of parts, it is apparent that the levers 19 and 20 are mounted for relative rotation at right angles one to the other. The location of the lever 19 nearer the remote end of its bolt 16 with respect to the lever 20 as best illustrated in FIG. 1 would permit the simultaneous movement of the levers 19 and 20 if it were not for an extension 27 formed on the side of lever 20 that causes it to overlap the adjacent marginal edge of the lever 19 when disposed in the upright or operative position. Since the lever 20 is spring loaded upwardly, it is this overlapping or abutment that maintains both levers 19 and 20 in the operative position, the normal action of the spring 21 of lever 19 in the downward direction being resisted thereby.

In order to move the levers to the operative position it is only necessary to forcibly raise the lever 19 against the normal action of its spring 21 to a point where the extension 27 can move under the upward influence of its spring 22 into the overlapping position behind the lever 19. To facilitate this, the corner or edge of the extension 27 is rounded as at 28 to cause its cam action against the adjacent edge of the lever 19. Thus, once the lever 20 gets its extension 27 behind the lever 19, virtually no further effort is required to overcome the downward force of spring 21 in order for the levers 19 and 20 to assume the extension upright or operative position.

In order to move the levers 19 and 20 to the depressed or inoperative position, it is only necessary to rotate the lever 20 downwardly against the normal action of its spring 22 until the extension 27 clears the edge of the lever 19 at which time lever 19 automatically rotates downward under the normal force of its spring 21. Once the lever 19 thus gets behind the lever 20 its abutment against the surface thereof serves to retain the lever 20 down against the normal influence of its spring 22. In this regard attention is particularly directed to he offcenter mounting of the boss 20' on its bolt 17 as evidenced by the location of the bolt centerline with reference to the boss diameter as best shown in FIG. 2.

The above operation is facilitated in the case of the raising of lever 19 to dispose the mechanism in its operative position by a lip 29 formed on the flange 25. This lip 29 extends at right angles from the outer end of the flange 25 forming a notch 30 which separates it from the adjacent floor or track surface when disposed in the inoperative or depressed position to allow its operation by foot by placing the toe under it and lifting. The workman or operator is thereby spared the time and trouble of bending or kneeling.

In the case of the lever 20 which is required to be forcibly lowered to dispose the mechanism in its inoperative position, the flange 26 serves as a convenient "pedal" for actuation by foot. Thus, the several mechanisms along the floor F or tracks T may be quickly depressed by the operator as he walks along length thereof.

It should be understood, however, that the above disclosure is specifically directed to a preferred embodiment of the invention. Numerous modifications and/or alterations may be made therein without departing from the scope of the invention.

What is claimed is:

1. A cargo restraint mechanism comprising:
    a mounting and supporting plate adapted to be secured to a structure;
    a first fixed pivot mounted transversely on said plate;
    a second fixed pivot mounted on said plate and disposed perpendicular to said first fixed pivot;
    a cargo engaging member rotatably mounted on each said pivot for extension and retraction relative thereto in a lateral direction;
    biasing means operative between said first fixed pivot and its member tending to move said member in one direction relative to said plate;
    biasing means operative between said second fixed pivot and its member tending to move said member in the opposite direction relative to said plate; and
    an extension on one of said members for engagement with the other member when located in its biased position whereby the members are maintained in each extreme position and movement of only one of said members is required for the automatic movement of the other member under the action of its biasing means.

2. The cargo restraint mechanism of claim 1 including handle means carried by each such member to facilitate the movement thereof against the action of its biasing means.

3. The cargo restraint mechanism of claim 1 wherein each said cargo-engaging member includes a flange at its outer, free end, extending in the opposite direction from the flange of the other cargo--engaging member when disposed in the operative position and adapted to engage complemental means carried by a piece of cargo, the dimensions of said members being predetermined to establish preselected spacing between adjacent cargo pieces thus engaged thereby.

4. The cargo restrain mechanism of claim 1 wherein said extension engages said other member by overlapping abutment therewith and includes a cam surface to facilitate such overlapping abutment.

5. The cargo restraint mechanism of claim 4 wherein said extension is carried by the member under bias to extension and the other member includes a lip facilitating its movement against its bias to retraction.

6. The cargo restraint mechanism of claim 1 wherein said structure is the floor of a cargo compartment within a vehicle and said cargo-engaging members are each mounted on their respective pivots for movement to and from an upright position, each being biased to its respective position by a torsion spring.

7. The cargo restraint mechanism of claim 6 wherein said extension is carried by the member under bias to extension and engages said other member by abutment therewith and the extension-carrying member aforesaid is mounted over center on its pivot whereby movement thereof out of the upright position clears it from abutment with said other member.

8. The cargo restraint mechanism of claim 1 wherein said plate is defined on one side by a surface conforming to that of said structure for flush abutment therewith and on the other side by laterally extending lugs mounting pivot supports for said cargo-engaging members and including a torsion spring operatively connected between each of said members and its mounting pivot to load such member in its biased direction.

* * * * *